United States Patent
Shimizu

(10) Patent No.: US 12,386,338 B2
(45) Date of Patent: Aug. 12, 2025

(54) ROBOT CONTROL SYSTEM, API PROCESSING METHOD OF ROBOT CONTROL SYSTEM, PROXY ACCESS DEVICE, AND STORAGE MEDIUM

(71) Applicant: TOYOTA JIDOSHA KABUSHIKI KAISHA, Toyota (JP)

(72) Inventor: Susumu Shimizu, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 17/872,519

(22) Filed: Jul. 25, 2022

(65) Prior Publication Data
US 2023/0091008 A1 Mar. 23, 2023

(30) Foreign Application Priority Data
Sep. 21, 2021 (JP) .................................. 2021-153370

(51) Int. Cl.
G05B 19/4155 (2006.01)
G06F 9/48 (2006.01)
G06F 9/54 (2006.01)

(52) U.S. Cl.
CPC ........... *G05B 19/4155* (2013.01); *G06F 9/48* (2013.01); *G06F 9/54* (2013.01); G05B 2219/50391 (2013.01)

(58) Field of Classification Search
None
See application file for complete search history.

(56) References Cited

U.S. PATENT DOCUMENTS

| | | | | |
|---|---|---|---|---|
| 6,363,411 | B1 * | 3/2002 | Dugan ................... | H04M 15/90 709/202 |
| 2001/0021882 | A1 * | 9/2001 | Hosonuma ............. | G06N 3/008 700/245 |
| 2002/0161480 | A1 * | 10/2002 | Kakutani ............... | G06N 3/008 700/250 |
| 2006/0161300 | A1 * | 7/2006 | Gonzalez-Banos ...... | B25J 9/161 700/245 |
| 2008/0058993 | A1 * | 3/2008 | Tain ................. | G05B 19/41845 700/275 |
| 2018/0074878 | A1 * | 3/2018 | Ma ....................... | G06F 11/0736 |
| 2019/0377349 | A1 * | 12/2019 | van der Merwe ... | G05D 1/0231 |

(Continued)

FOREIGN PATENT DOCUMENTS

JP 6138782 B2 5/2017
WO 2013/022716 A1 2/2013

*Primary Examiner* — Lewis A Bullock, Jr.
*Assistant Examiner* — Jordan Scott Motter
(74) *Attorney, Agent, or Firm* — Oliff PLC

(57) ABSTRACT

A robot control system includes a cloud server connected to a public network disposed outside an area, a robot scenario control device disposed on an on-premise area and configured to control a device that is a control target while calling an API provided by a cloud server, a proxy access processing unit configured to return an API response corresponding to the API call request to the robot scenario control device, a storage device configured to store API-related information that is related to the API, in which the proxy access processing unit is configured to return the API response to the robot scenario control device based on the API-related information stored in the storage device in a case where the API-related information is stored in the storage device.

6 Claims, 8 Drawing Sheets

(56) References Cited

U.S. PATENT DOCUMENTS

2020/0171671 A1* 6/2020 Huang .................. B25J 9/0084
2020/0306988 A1* 10/2020 Shaffer .............. G05B 19/4184
2021/0220064 A1* 7/2021 Kottenstette .......... B25J 9/1689

* cited by examiner

ROBOT CONTROL SYSTEM, API PROCESSING METHOD OF ROBOT CONTROL SYSTEM, PROXY ACCESS DEVICE, AND STORAGE MEDIUM

CROSS-REFERENCE TO RELATED APPLICATION

This application claims priority to Japanese Patent Application No. 2021-153370 filed on Sep. 21, 2021, incorporated herein by reference in its entirety.

BACKGROUND

1. Technical Field

The present disclosure relates to a robot control system, an API processing method of a robot control system, a proxy access device, and a storage medium, and relates to, for example, a robot control system including a robot scenario control device that controls a robot by using an API provided by a cloud server, an API processing method of a robot control system, a proxy access device, and a storage medium.

2. Description of Related Art

In recent years, in various systems, a hybrid cloud that causes a cloud server installed on an open public network to be charge of a part of processing and executes another processing by a device installed in a closed on-premise area has been used. As load distribution between the cloud server and the device in the on-premise area, there are various configuration examples, such as a first configuration example in which information having high importance is processed on the on-premise area side and information having low importance is processed on a cloud side, a second configuration example in which information backup on the on-premise area side is executed on the cloud side in consideration of business continuity, and a third configuration example in which a load of the device on-premise side is offloaded to the cloud side. Therefore, the technology related to the hybrid cloud is disclosed in Japanese Patent No. 6138782 (JP 6138782 B).

The hybrid unified communications (UC) disposition disclosed in JP 6138782 B is a method that provides a hybrid unified communications disposition including telephony, the method including a step of hosting a tenant including users using a UC cloud disposition including a PSTN communication that is integrated with a UC on-premise disposition for the tenant, a step of maintaining and managing an identification information of the tenant consistently between the UC cloud disposition and the UC on-premise disposition, a step of storing policies that are used in both the UC cloud disposition and the UC on-premise disposition, and a step of associating a selection of a Telco provider that provides a PSTN service, from the tenant.

SUMMARY

However, in a case where a configuration of a hybrid cloud is applied to a robot installed on an on-premise area side, communication with a cloud server is executed via a relay device including a firewall device and the like, and thus there are often contracts for cloud access. In such a case, accessing the cloud server from the robot is unstable, there is a risk that affects the operation of the robot. With respect to such a problem, in the related art, the processing distribution between the cloud server and a device on the on-premise area side, such as the robot, is fixed, it is not possible to flexibly switch the processing distribution in accordance with the operation of the robot, and it is not possible to eliminate the instability of the operation of the robot.

The present disclosure has been made to solve such a problem, and is to improve the operational stability of a robot that uses processing by the cloud server and is disposed on the on-premise area side.

A first aspect of the present disclosure relates to a robot control system including a cloud server, a robot scenario control device, a proxy access processing unit, a storage device, and a communication relay device. The cloud server is connected to a public network disposed outside an area. The robot scenario control device is disposed on an on-premise area in which communication between devices disposed in the area is executed by a local network constructed in the area. The robot scenario control device is configured to control a device that is a control target while calling an application program interface (API) provided by the cloud server by an API call request. The proxy access processing unit is disposed on the on-premise area. The proxy access processing unit is configured to return an API response corresponding to the API call request to the robot scenario control device. The storage device is disposed on the on-premise area. The storage device is configured to store API-related information that is related to the API. The communication relay device is configured to relay communication between the local network and the public network. The proxy access processing unit is configured to return the API response to the robot scenario control device based on the API-related information stored in the storage device in a case where the API-related information is stored in the storage device.

A second aspect of the present disclosure relates to an application program interface (API) processing method in a robot control system. The robot control system includes a cloud server connected to a public network disposed outside an area, a robot scenario control device disposed on an on-premise area in which communication between devices disposed in the area is executed by a local network constructed in the area, the robot scenario control device being configured to control a device that is a control target while calling an API provided by the cloud server by an API call request, and a communication relay device configured to relay communication between the local network and the public network. The API processing method includes proxy access processing of returning an API response corresponding to the API call request to the robot scenario control device, and storage processing of storing API-related information that is related to the API in a storage device disposed on the on-premise area. In the proxy access processing, the API response is returned to the robot scenario control device based on the API-related information stored in the storage device in a case where the API-related information is stored in the storage device.

A third aspect of the present disclosure relates to a proxy access device configured to return an application program interface (API) response corresponding to an API call request to a robot scenario control device configured to control a device that is a control target while calling an API provided by a cloud server by the API call request. The proxy access device includes a proxy access processing unit and a storage device. The proxy access processing unit is configured to return the API response to the robot scenario control device in response to the API call request. The storage device is configured to be occupied and used by the proxy access processing unit, and store API-related information that is related to the API. The proxy access processing unit is configured to return the API response to the robot scenario control device based on the API-related information stored in the storage device in a case where the API-related information is stored in the storage device.

A fourth aspect of the present disclosure relates to a storage medium storing a proxy access program that is executed on a computer including a storage device and returns an application program interface (API) response corresponding to an API call request to a robot scenario control device configured to control a device that is a control target while calling an API provided by a cloud server by the API call request. The storage medium executes proxy access processing of returning the API response to the robot scenario control device in response to the API call request, and storage processing of storing API-related information that is related to the API in the storage device. In the proxy access processing, the API response is returned to the robot scenario control device based on the API-related information stored in the storage device in a case where the API-related information is stored in the storage device.

In the robot control system, the API processing method of the robot control system, the proxy access device, and the storage medium according to the aspects of the present disclosure, the API response to the API call request issued by the robot scenario control device to the cloud server is returned by the proxy access processing.

According to the present disclosure, it is possible to eliminate the instability in a case where the API provided by the cloud server is used by the device disposed on the on-premise area side.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
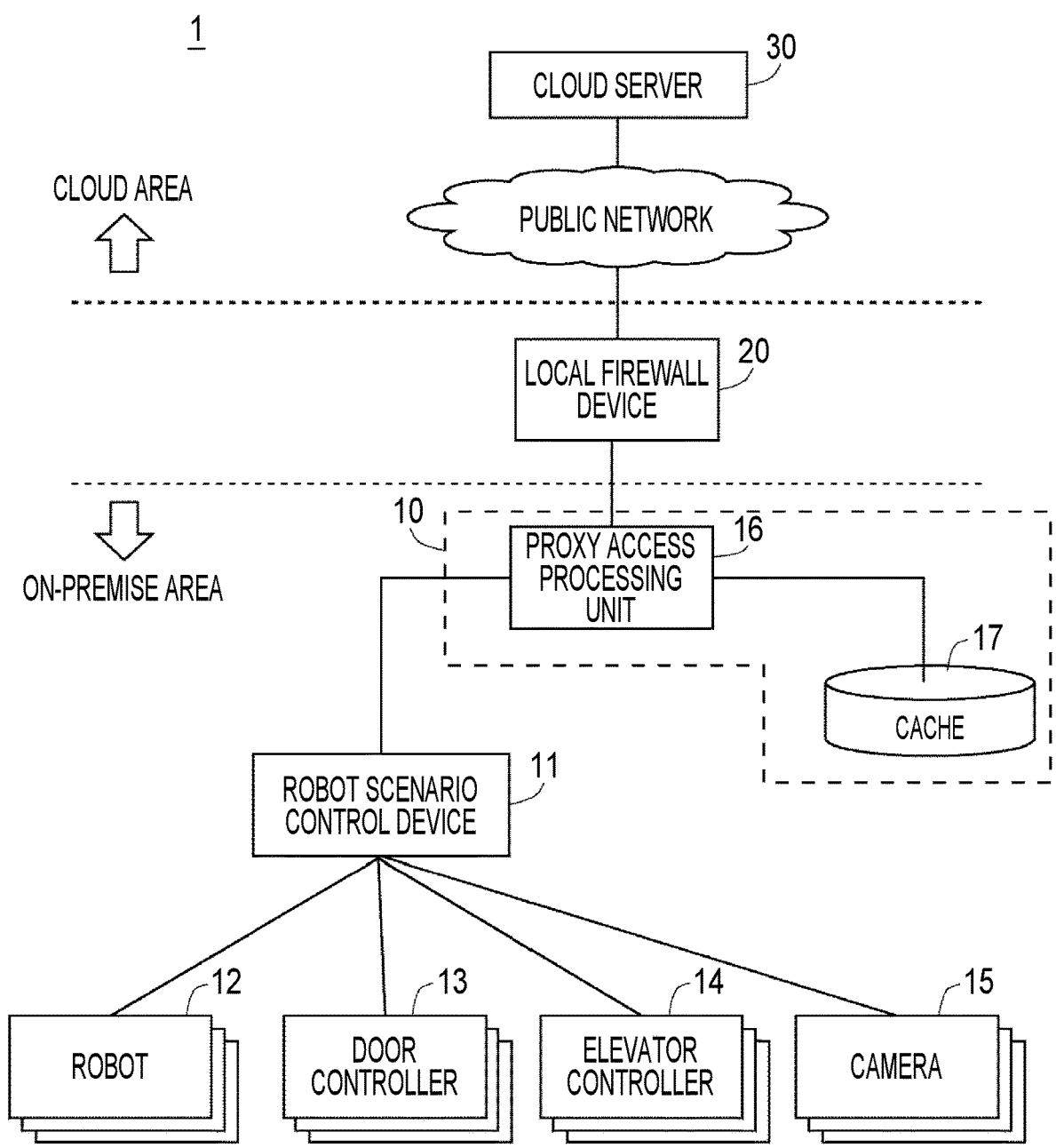
FIG. 1 is a schematic diagram of a robot control system according to a first embodiment.

In order to clarify the description, the following description and drawings are omitted or simplified as appropriate. In addition, each element described in the drawing as a functional block that executes various pieces of processing can be configured by a central processing unit (CPU), a memory, and other circuits in terms of hardware, and is realized by a program and the like loaded into the memory in terms of software. Therefore, it is understood by those skilled in the art that these functional blocks can be realized in various ways by solely hardware, solely software, or a combination thereof, and the present disclosure is not limited thereto. Note that, in each drawing, the same elements are designated by the same reference numerals, and duplicate descriptions are omitted as needed.

In addition, the program described above includes an instruction group (or software code) causing a computer to execute one or more functions described in the embodiment in a case where the program is loaded into the computer. The program may be stored on a non-transitory computer-readable medium or a tangible storage medium. Although not limited to these, examples of the computer-readable medium or the tangible storage medium include a random-access memory (RAM), a read-only memory (ROM), a flash memory, a solid-state drive (SSD) or other memory technologies, a CD-ROM, a digital versatile disc (DVD), a Blu-ray (registered trademark) disc or other optical disc storages, and a magnetic cassette, a magnetic tape, a magnetic disk storage or other magnetic storage devices. The program may be transmitted on a transitory computer-readable medium or a communication medium. Although not limited to these, examples of the transitory computer-readable medium or the communication medium include electrical, optical, acoustic, or other forms of propagating signals.

First Embodiment

FIG. 1 shows a block diagram of a robot control system 1 according to a first embodiment, and the robot control system 1 will be described in detail. First, in the following description, an area in which a cloud server connected via a public network is installed is referred to as a cloud area. Note that, in the cloud area, the public network need only be used as an access route to the cloud server, and accessing the cloud server does not have to be open to the public, and may be limited to, for example, a contractor. In addition, an area in which a plurality of devices is connected to a closed local network that is connected to the public network via a relay device, such as a firewall device in an office, and is prohibited from being accessed by an outsider is referred to as an on-premise area.

Moreover, in the robot control system 1 according to the first embodiment, a cloud server 30 is disposed in the cloud area, and a proxy access device 10, a robot scenario control device 11, a robot 12, a door controller 13, an elevator controller 14, a camera 15, and the like are disposed in the on-premise area. Moreover, in the robot control system 1 according to the first embodiment, the communication between the local network in the on-premise area and the public network in the cloud area is relayed by the relay device (for example, a local firewall device 20).

Here, a system configuration example in the on-premise area will be described. As shown in FIG. 1, in the robot control system 1 according to the first embodiment, the robot scenario control device 11 controls the devices that are control targets by using an API provided by the cloud server. In the example shown in FIG. 1, the robot 12, the door controller 13, the elevator controller 14, and the camera 15 are shown as the control targets of the robot scenario control device 11, but the control target of the robot scenario control device 11 is not limited to these.

The proxy access device 10 receives an API call request from the robot scenario control device 11 and returns an API response corresponding to the API call request to the robot scenario control device 11. In this case, the proxy access device 10 includes a cache, and in a case where API-related information that is related to the API corresponding to the API call request is stored in the cache, the proxy access device 10 generates the API response based on the API-related information in the cache and returns the API response to the robot scenario control device 11 without transmitting the API call request to the cloud server 30. In addition, in a case where the API-related information is not stored in the cache, the proxy access device 10 transmits the API call request to the cloud server 30 and returns the API response obtained from the cloud server 30 to the robot scenario control device 11.

Here, the proxy access device 10 will be described in more detail. The proxy access device 10 includes a proxy access processing unit 16 and a cache 17. The proxy access device 10 can realize the proxy access processing unit 16 by a proxy access program executed on the computer or dedicated hardware. In addition, the proxy access processing unit 16 may be a storage device provided in a housing of a device on which the proxy access program or the dedicated hardware is mounted, and may be mounted as another device connected to the housing via the network.

The proxy access processing unit 16 is disposed in the on-premise area and returns the API response corresponding to the API call request to the robot scenario control device. In addition, the API-related information that is related to the API is stored in the cache 17. Moreover, in a case where the API-related information is stored in the cache 17, the proxy access processing unit 16 returns the API response to the robot scenario control device based on the API-related information stored in the cache 17. In addition, in a case where the API-related information corresponding to the API call request is not stored in the cache 17, the proxy access processing unit 16 transmits the API call request to the cloud server 30, returns the API response acquired from the cloud server 30 to the robot scenario control device 11, and the stores the API-related information acquired from the cloud server 30 in the cache 17.

Figure 2:
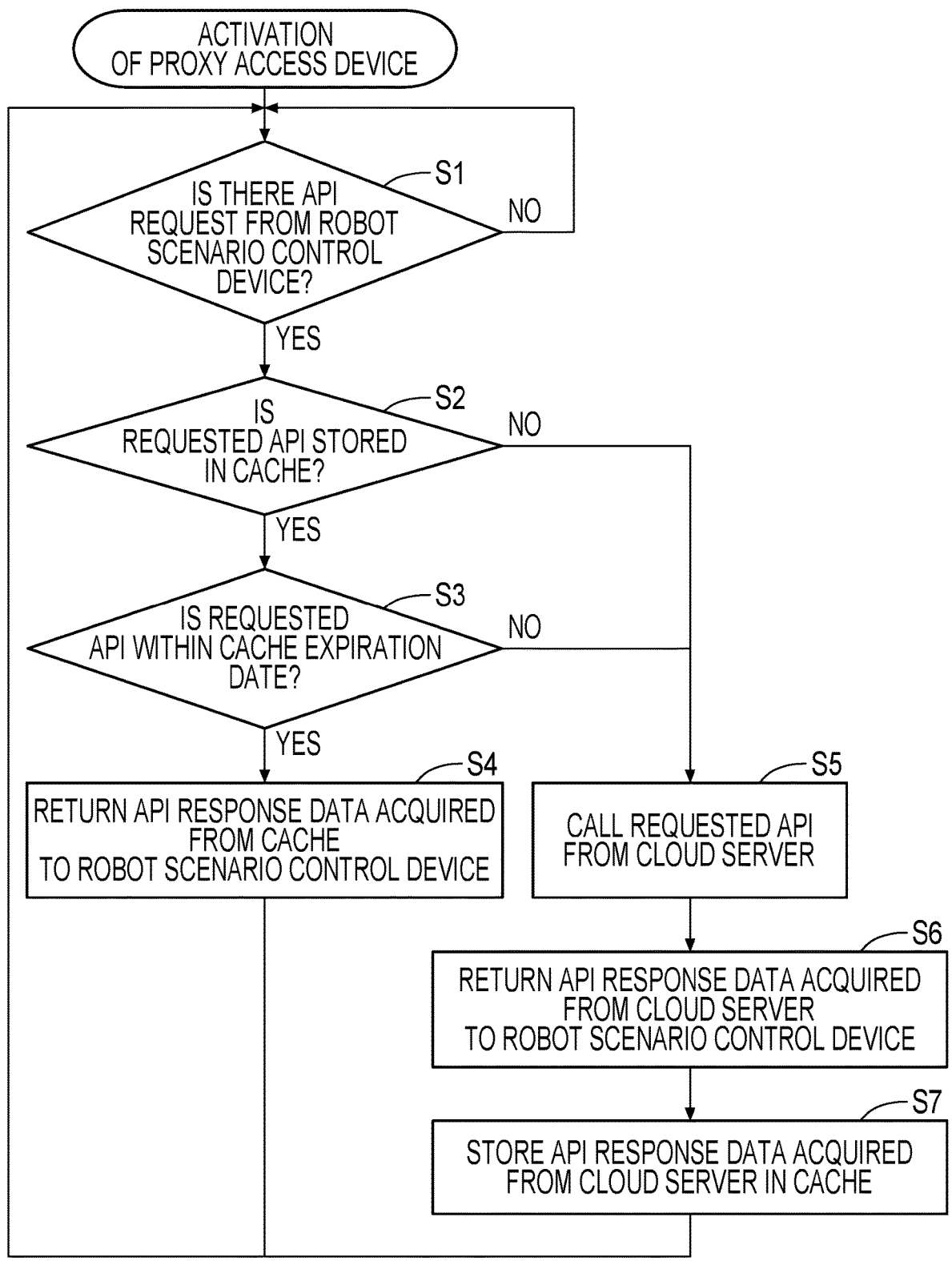
FIG. 2 is a flowchart for describing an operation of a proxy access device according to the first embodiment.

Subsequently, an operation of the proxy access device 10 according to the first embodiment will be described in detail. Therefore, FIG. 2 shows a flowchart for describing the operation of the proxy access device 10 according to the first embodiment. When the proxy access device 10 starts the operation, the operation of the proxy access device 10 is in a standby state until there is an API request (for example, the API call request) from the robot scenario control device 11 (step S1). Moreover, when the API call request is received from the robot scenario control device 11, the proxy access processing unit 16 confirms whether the API-related information of the requested API is stored in the cache 17 (step S2).

Moreover, in a case where the confirmation is made in step S2 that the API-related information is stored in the cache 17 (YES branch in step S2), the proxy access processing unit 16 further determines whether or not the API-related information stored in the cache 17 is within a preset cache expiration date (step S3). Then, in step S3, in a case where the API-related information stored in the cache 17 is within the cache expiration date (YES branch of step S3), the proxy access processing unit 16 generates the API response based on the API-related information stored in the cache 17 and returns the API response to the robot scenario control device 11 (step S4).

On the other hand, in a case where the confirmation is made that the API-related information is not stored in the cache 17 in step S2 (NO branch of step S2) or in a case where the API-related information stored in the cache 17 in step S3 exceeds the cache expiration date (NO branch of step S3), the proxy access processing unit 16 transmits the API call request received from the robot scenario control device 11 to the cloud server 30 and calls the API response related to the requested API from the cloud server 30 (step S5). Moreover, the proxy access processing unit 16 returns the API response acquired in step S5 to the robot scenario control device 11 (step S6). In addition, the proxy access processing unit 16 acquires the API-related information from the cloud server 30 and stores the API-related information in the cache 17 (step S7). The proxy access device 10 executes the operations of steps S1 to S7 each time the API call request is received from the robot scenario control device 11.

From the above description, in the robot control system 1 according to the first embodiment, the proxy access device 10 returns the API response to the API call request requested by the robot scenario control device 11 based on the API-related information stored in the cache 17 without accessing the cloud server 30. As a result, in the robot control system 1 according to the first embodiment, it is possible to avoid the instability of the communication that occurs when accessing the cloud server 30 via the local firewall device 20 or the public network and to secure a stable operation of the robot scenario control device 11.

In addition, in the robot control system 1 according to the first embodiment, in a case where the API-related information corresponding to the API call request issued by the robot scenario control device 11 is not stored in the cache 17, the proxy access processing unit 16 transmits the API call request to the cloud server 30 to acquire the API response. Further, in the robot control system 1 according to the first embodiment, the API-related information that is related to the API call request is acquired from the cloud server 30 and stored in the cache 17. As a result, in the robot control system 1 according to the first embodiment, the API to be processed in the on-premise area can be dynamically changed without setting the API to be processed in the on-premise area in advance.

Since the cache 17 is used in the processing, the robot control system 1 according to the first embodiment is particularly effective in processing related to the API that uses a calculation result (for example, API processing related to position calculation processing, individual authentication processing, image processing, and behavior prediction processing).

Second Embodiment

Figure 3:
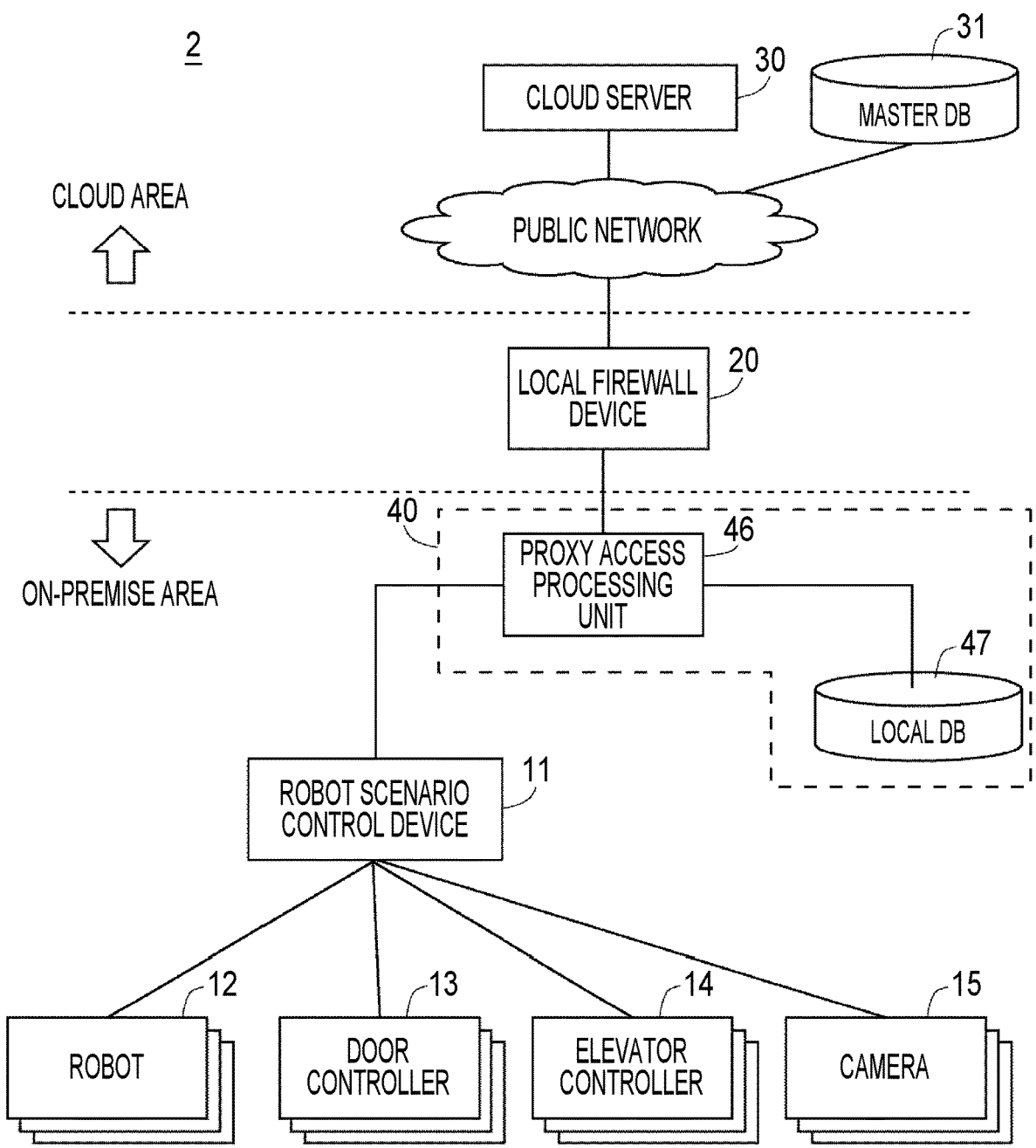
FIG. 3 is a schematic diagram of a robot control system according to a second embodiment.

In a second embodiment, a robot control system 2 including a proxy access device 40 that is another embodiment of the proxy access device 10 will be described. FIG. 3 is a schematic diagram of the robot control system according to the second embodiment. As shown in FIG. 3, the proxy access device 40 includes a proxy access processing unit 46 and a local database 47 instead of the proxy access processing unit 16 and the cache 17. In addition, in the robot control system 2 according to the second embodiment, a master database 31 is provided in the cloud area.

The proxy access processing unit 46 executes the processing related to the API call request issued by the robot scenario control device 11 with reference to the local database 47, and executes synchronization processing of storage contents between the local database 47 and the master database 31 in a case where the API for which the processing is executed is registered in advance. Here, the proxy access processing unit 46 executes processing related to the API that uses a database, such as an API that searches for a content of the local database 47, an API that stores a control history of the robot scenario control device 11 in the local database 47, and an API that stores a movement history of the robot 12 in the local database 47.

Figure 4:
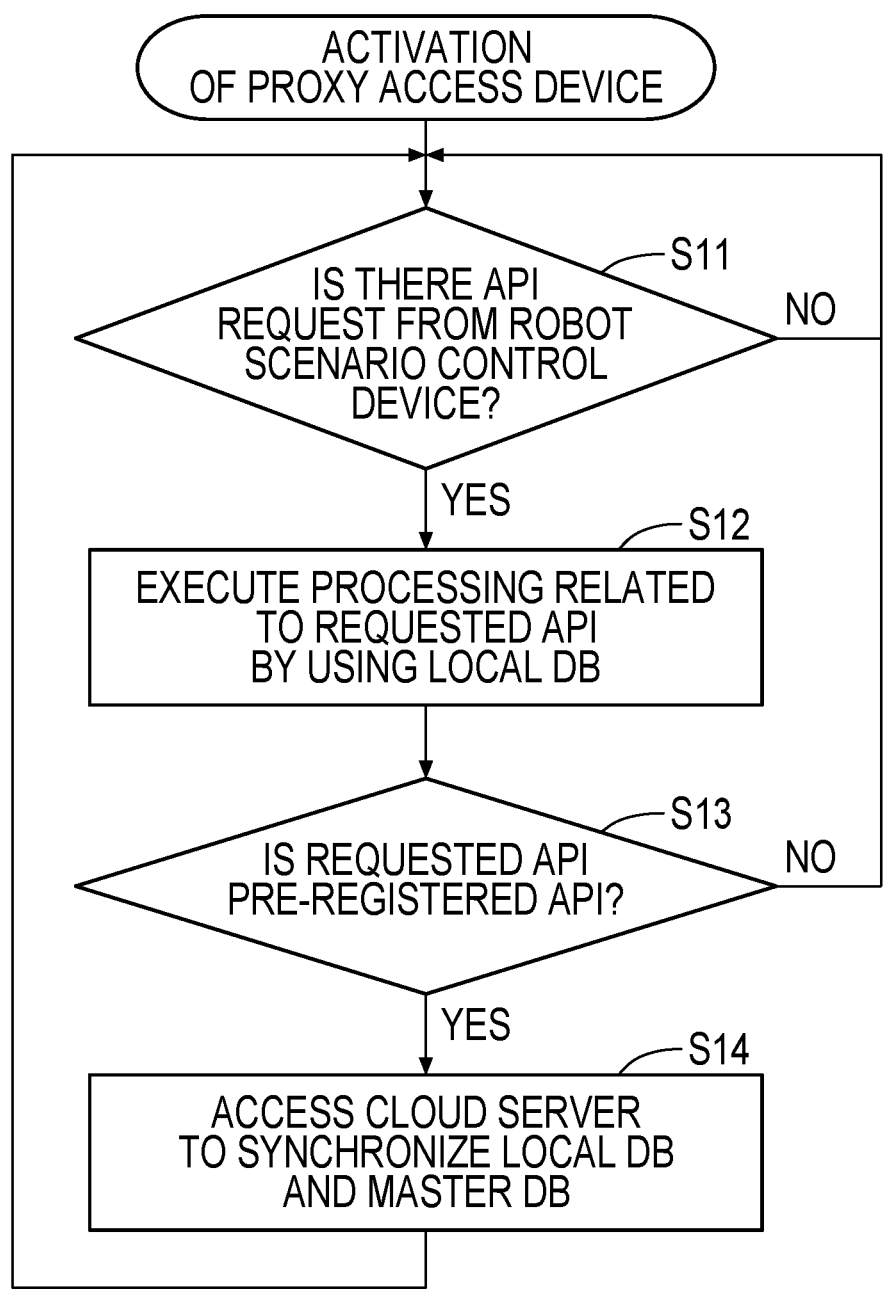
FIG. 4 is a flowchart for describing an operation of a proxy access device according to the second embodiment.

Here, an operation of the proxy access device 40 of the robot control system 2 according to the second embodiment will be described in detail. Therefore, FIG. 4 shows a flowchart for describing the operation of the proxy access device according to the second embodiment. As shown in FIG. 4, when the proxy access device 40 is activated, the proxy access processing unit 46 waits for the API call request from the robot scenario control device 11 (step S11).

Moreover, when the API call request is received from the robot scenario control device 11, the proxy access processing unit 46 executes the processing related to the API call request by using the local database 47 (step S12). In addition, the proxy access processing unit 46 determines whether or not the API processed in step S12 is the API registered in advance (step S13). In a case where the determination is made in step S13 that the API processed in step S12 is not the API registered in advance (NO branch of step S13), the proxy access device 40 waits for the API call request from the robot scenario control device 11 again. On the other hand, the determination is made in step S13 that the API processed in step S12 is the API registered in advance (YES branch of step S13), the proxy access processing unit 46 access the cloud server 30 to synchronize the local database 47 and the master database 31 (step S14), and then waits for the API call request from the robot scenario control device 11 again.

From the above description, in the robot control system 2 according to the second embodiment, even in the API that accumulates data and uses the accumulated data, a frequency of accessing the cloud server 30 can be reduced to improve the operational stability of the robot scenario control device 11.

In addition, in the robot control system 2 according to the second embodiment, the synchronization processing of the local database 47 and the master database 31 can be executed asynchronously with an operation timing of the robot scenario control device 11. That is, in the robot control system 2 according to the second embodiment, the synchronization processing can be executed at a timing that does not interfere with the operation of the robot scenario control device 11, and the operational stability of the robot scenario control device 11 can be improved.

Third Embodiment

Figure 5:
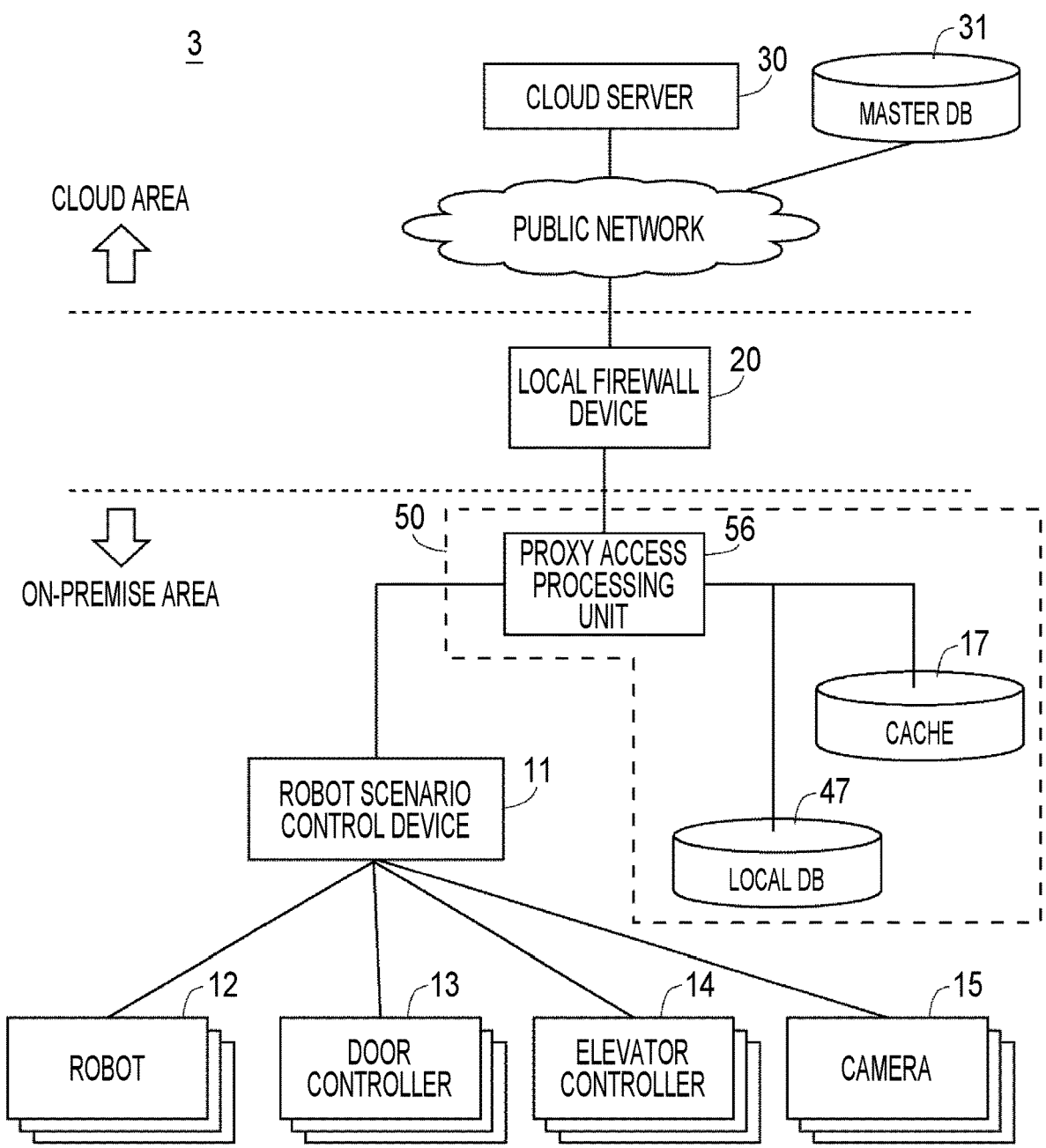
FIG. 5 is a schematic diagram of a robot control system according to a third embodiment.

In a third embodiment, a proxy access device 50 having both the functions of the proxy access device 10 and the proxy access device 40 will be described. Therefore, FIG. 5 shows a schematic diagram of the robot control system according to the third embodiment. As shown in FIG. 5, the proxy access device 50 includes a proxy access processing unit 56 instead of the proxy access processing unit 16. In addition, the proxy access device 50 includes the local database 47 adopted by the proxy access device 40 in addition to the cache 17.

The proxy access processing unit 56 has both the function of the proxy access processing unit 16 and the function of the proxy access processing unit 46, and can handle both an API of a calculation processing system and an API of a storage and search processing system.

From the above description, in a robot control system 3 according to the third embodiment, in both the API of the calculation processing system and the API of the storage and search processing system, the frequency of accessing the cloud server 30 can be reduced to improve the operational stability of the robot scenario control device 11.

Fourth Embodiment

In a fourth embodiment, a robot control system 4 that is another embodiment of the robot control system 3 according to the third embodiment will be described. Therefore, FIG. 6 shows a schematic diagram of the robot control system 4 according to the fourth embodiment.

Figure 6:
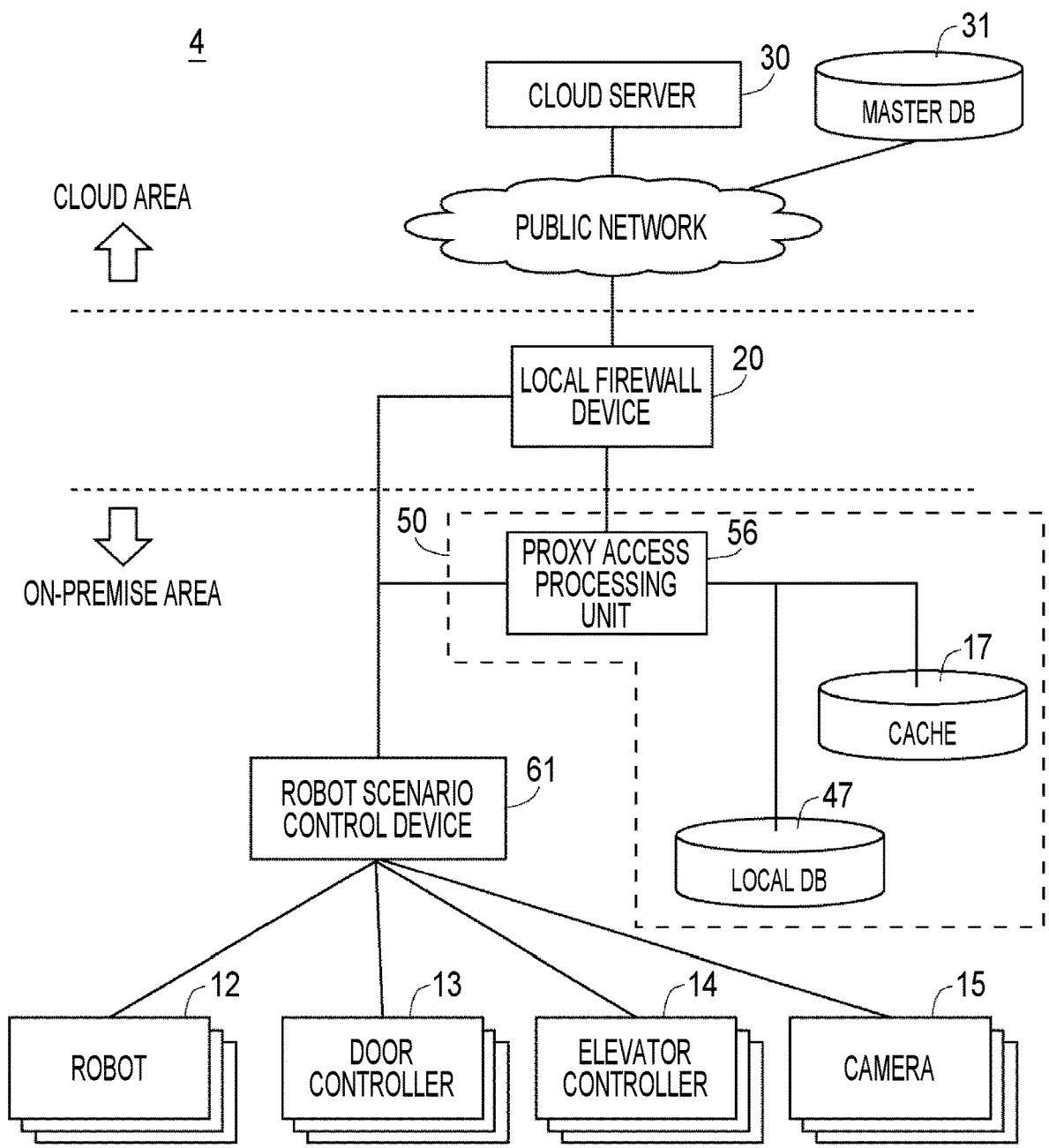
FIG. 6 is a schematic diagram of a robot control system according to a fourth embodiment.

As shown in FIG. 6, the robot control system 4 according to the fourth embodiment includes a robot scenario control device 61 instead of the robot scenario control device 11 of the robot control system 1. The robot scenario control device 61 has a function of accessing the cloud server 30 without going through the proxy access device 50, in addition to accessing the proxy access device 50. Moreover, the robot scenario control device 61 switches whether to obtain the response of the API call request from the cloud server 30 or the proxy access device 50 in accordance with a response speed of an access destination. Specifically, there are a first example and a second example in a method of acquiring the API response of the robot scenario control device 61.

Figure 7:
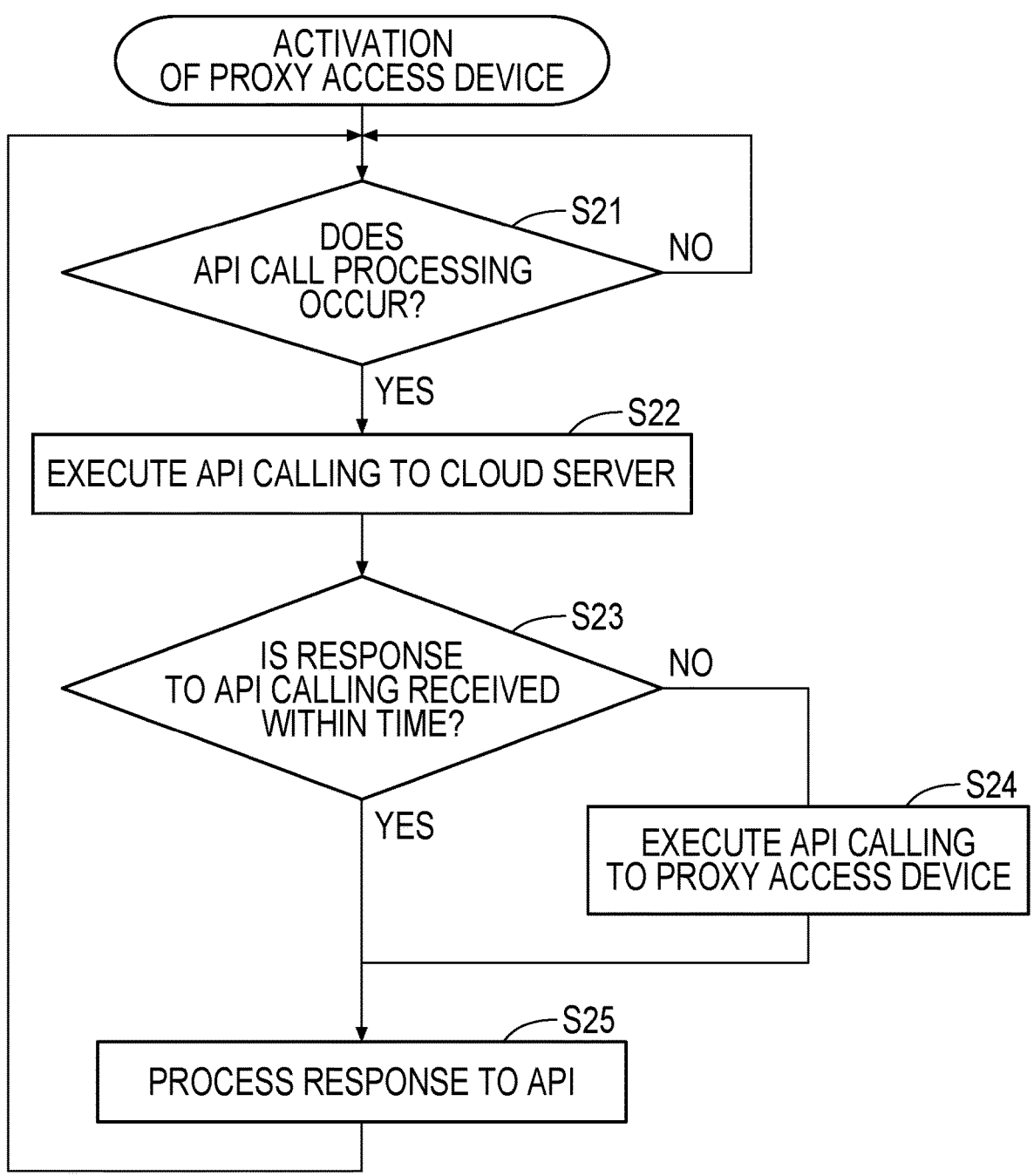
FIG. 7 is a flowchart for describing a first example of an operation of a robot scenario control device according to the fourth embodiment.

FIG. 7 shows a flowchart for describing the first example of an operation of the robot scenario control device 61 according to the fourth embodiment. As shown in FIG. 7, in the first example, when API call processing occurs in the robot scenario control device 61 (YES branch in step S21), the robot scenario control device 61 transmits the API call request to the cloud server 30 (step S22). Moreover, in a case where there is no API response from the cloud server 30 within a preset specified time (NO branch of step S23), the robot scenario control device 61 issues the API call request to the proxy access processing unit 56 in the proxy access device 50 (step S24), and performs the processing based on the API response obtained from the proxy access device 50 (step S25). On the other hand, in a case where there is the API response from the cloud server 30 within the preset specified time (YES branch of step S23), the robot scenario control device 61 executes the processing based on the API response obtained from the cloud server 30 (step S25).

Figure 8:
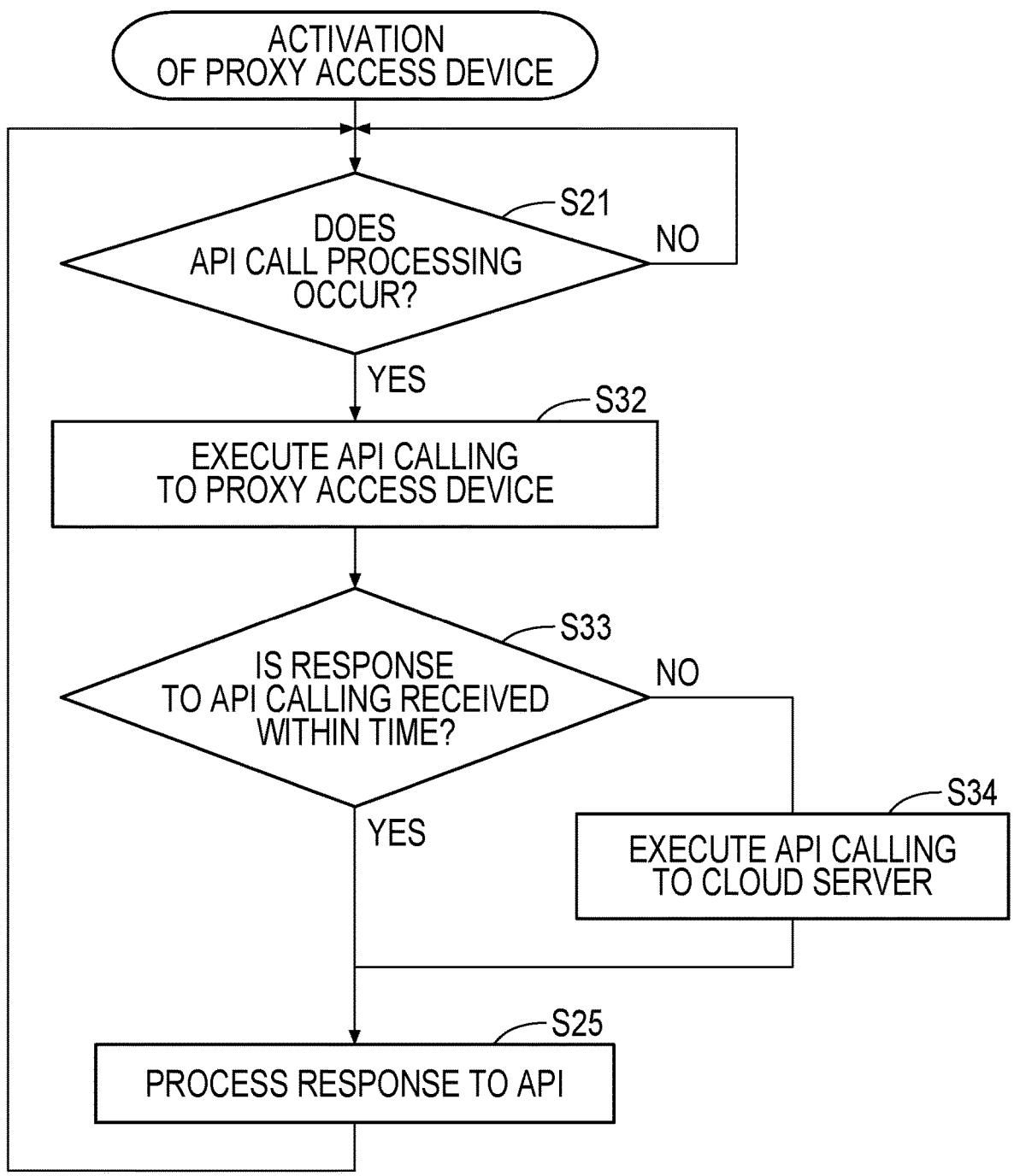
FIG. 8 is a flowchart for describing a second example of the operation of the robot scenario control device according to the fourth embodiment.

In addition, FIG. 8 shows a flowchart for describing the second example of the operation of the robot scenario control device according to the fourth embodiment. As shown in FIG. 8, in the second example, when the API call processing occurs in the robot scenario control device 61 (YES branch in step S21), the robot scenario control device 61 transmits the API call request to the proxy access device 50 (step S32). Moreover, in a case where there is no API response from the proxy access device 50 within the preset specified time (NO branch of step S33), the robot scenario control device 61 issues the API call request to the cloud server 30 (step S34), and performs the processing based on the API response obtained from the cloud server 30 (step S25). On the other hand, in a case where there is the API response from the proxy access device 50 within the preset specified time (YES branch of step S33), the robot scenario control device 61 executes the processing based on the API response obtained from the proxy access device 50 (step S25).

From the above description, in the robot control system 4 according to the fourth embodiment, the robot scenario control device 61 switches whether to issue the request to the cloud server 30 or the proxy access device 50 based on a response time from the transmission destination of the API call request. As a result, in the robot control system 4 according to the fourth embodiment, it is possible to always select a route without an obstacle even in a case where the congestion of the public network or the congestion of the processing of the proxy access device 50 occurs, and it is possible to improve the operational stability of the robot scenario control device 61.

Although the disclosure made by the present inventors has been specifically described above based on the embodiments, the present disclosure is not limited to the embodiments described so far, and it is needless to say that various changes can be made without departing from the gist thereof.

What is claimed is:

1. A robot control system comprising:
a cloud server connected to a public network disposed outside an area;
a robot scenario control device disposed on an on-premise area in which communication between devices disposed in the area is executed by a local network constructed in the area, the robot scenario control device being configured to control a device that is a control target while calling an application program interface (API) provided by the cloud server by an API call request;
a communication relay device configured to relay communication between the local network and the public network; and
a master database provided in an area accessible by the cloud server; and
a proxy access processing unit disposed on the on-premise area, the proxy access processing unit being configured to return an API response corresponding to the API call request to the robot scenario control device, wherein the proxy access processing unit comprises;
a storage device disposed on the on-premise area, the storage device including:
a local database; and a cache, the cache being configured to store API-related information that is related to the API; and
wherein the proxy access processing unit is configured to:
while receiving at least two API call requests, wherein at least one API call request is associated with an API registered in advanced and at least one API call request is associated with an API not registered in advanced, execute synchronization processing of storage contents between the local database and the master database, the synchronization processing being executed asynchronously with an operation timing of the robot scenario control device;
processing the received API call requests by performing the steps of:
determine if the API call requests is for processing an API that is registered in advance;
based on the API call request being directed to an API that is registered in advanced, performing the steps of:
execute processing related to the received API call request with reference to the local database; and
return the API response to the robot scenario control device;
for the received API call requests that are associated with an API not registered in advanced, performing the steps of:
determine if the API-related information corresponding to the API call request is stored in the cache; and
in a case where the API-related information corresponding to the API call request is stored in the cache, return the API response to the robot scenario control device based on the API-related information stored in the cache in a case where the API-related information is stored in the cache,
in a case where the API-related information corresponding to the API call request is not stored in the cache, performing the steps of:
transmit the API call request to the cloud server;
process the API call request at the cloud server to generate an API response;
return the API response acquired from the cloud server to the robot scenario control device; and
store the API-related information corresponding to the received API call request acquired from the cloud server, in the cache.

2. The robot control system according to claim 1, wherein the robot scenario control device is configured to
issue the API call request to the cloud server, and
issue the API call request to the proxy access processing unit in a case where a response from the cloud server is not returned within a preset time.

3. The robot control system according to claim 1, wherein the robot scenario control device is configured to
issue the API call request to the proxy access processing unit, and
issue the API call request to the cloud server in a case where a response from the proxy access processing unit is not returned within a preset time.

4. In a robot control system comprising:
a cloud server connected to a public network disposed outside an area;
a robot scenario control device disposed on an on-premise area in which communication between devices disposed in the area is executed by a local network constructed in the area, the robot scenario control device being configured to control a device that is a control target while calling an application program interface (API) provided by the cloud server by an API call request;
a communication relay device configured to relay communication between the local network and the public network; and
a master database provided in an area accessible by the cloud server; and
a proxy access processing unit disposed on the on-premise area, the proxy access processing unit being configured to return an API response corresponding to the API call request to the robot scenario control device, wherein the proxy access processing unit comprises;
a storage device disposed on the on-premise area, the storage device including:
a local database; and a cache, the cache being configured to store API-related information that is related to the API, performing an application program interface (API) processing method, by the proxy access processing unit, by performing the steps of
while receiving at least two API call requests, wherein at least one API call request is associated with an API registered in advanced and at least one API call request is associated with an API not registered in advanced, execute synchronization processing of storage contents between the local database and the master database, the synchronization processing being executed asynchronously with an operation timing of the robot scenario control device;
processing the received API call requests by performing the steps of:
determine if the API call requests is for processing an API that is registered in advance;
based on the API call request being directed to an API that is registered in advanced, performing the steps of:
execute processing related to the received API call request with reference to the local database; and
return the API response to the robot scenario control device;
for the received API call requests that are associated with an API not registered in advanced, performing the steps of:
determine if the API-related information corresponding to the API call request is stored in the cache; and
in a case where the API-related information corresponding to the API call request is stored in the cache, return the API response to the robot scenario control device
in a case where the API-related information corresponding to the API call request is not stored in the cache, performing the steps of:
transmit the API call request to the cloud server;
process the API call request at the cloud server to generate an API response;
return the API response acquired from the cloud server to the robot scenario control device; and
store the API-related information corresponding to the received API call request acquired from the cloud server, in the cache.

5. A proxy access device configured to return an application program interface (API) response corresponding to an API call request to a robot scenario control device configured to control a device that is a control target while calling an API provided by a cloud server by the API call request, wherein the cloud server is connected to a public network disposed outside an area; the robot scenario control device disposed on an on-premise area in which communication between devices disposed in the area is executed by a local network constructed in the area, and a master database is provided in an area accessible by the cloud server; and the proxy access device comprising:
a proxy access processing unit; and
a storage device disposed on the on-premise area and configured to be occupied and used by the proxy access processing unit, the storage device including
a local database; and a cache, the cache being configured to store API-related information that is related to the API; and
wherein the proxy access processing unit is configured to:
while receiving at least two API call requests, wherein at least one API call request is associated with an API registered in advanced and at least one API call request is associated with an API not registered in advanced, execute synchronization processing of storage contents between the local database and the master database, the synchronization processing being executed asynchronously with an operation timing of the robot scenario control device;
processing the received API call requests by performing the steps of:
determine if the API call requests is for processing an API that is registered in advance;
based on the API call request being directed to an API that is registered in advanced, performing the steps of:
execute processing related to the received API call request with reference to the local database; and
return the API response to the robot scenario control device;
for the received API call requests that are associated with an API not registered in advanced, performing the steps of:
determine if the API-related information corresponding to the API call request is stored in the cache; and
in a case where the API-related information corresponding to the API call request is stored in the cache, return the API response to the robot scenario control device based on the API-related information stored in the cache in a case where the API-related information is stored in the cache,
in a case where the API-related information corresponding to the API call request is not stored in the cache, performing the steps of:
transmit the API call request to the cloud server;
process the API call request at the cloud server to generate an API response;
return the API response acquired from the cloud server to the robot scenario control device; and
store the API-related information corresponding to the received API call request acquired from the cloud server, in the cache.

6. A non-transitory storage medium storing a proxy access program that is executed on a proxy access device configured to return an application program interface (API) response corresponding to an API call request to a robot scenario control device configured to control a device that is a control target while calling an API provided by a cloud server by the API call request, wherein the cloud server is connected to a public network disposed outside an area; the robot scenario control device disposed on an on-premise area in which communication between devices disposed in the area is executed by a local network constructed in the area, and a master database is provided in an area accessible by the cloud server; and the proxy access device comprising:
a proxy access processing unit; and a storage device disposed on the on-premise area and configured to be occupied and used by the proxy access processing unit, the storage device including a local database; and a cache, and the cache being configured to store API-related information that is related to the API, the proxy access program, when executed by the proxy access device performing the steps of:
while receiving at least two API call requests, wherein at least one API call request is associated with an API registered in advanced and at least one API call request is associated with an API not registered in advanced, execute synchronization processing of storage contents between the local database and the master database, the synchronization processing being executed asynchronously with an operation timing of the robot scenario control device;
processing the received API call requests by performing the steps of:
determine if the API call requests is for processing an API that is registered in advance;
based on the API call request being directed to an API that is registered in advanced, performing the steps of:
execute processing related to the received API call request with reference to the local database; and
return the API response to the robot scenario control device;

for the received API call requests that are associated with an API not registered in advanced, performing the steps of:

determine if the API-related information corresponding to the API call request is stored in the cache; and in a case where the API-related information corresponding to the API call request is stored in the cache, return the API response to the robot scenario control device in a case where the API-related information corresponding to the API call request is not stored in the cache, performing the steps of:

transmit the API call request to the cloud server;

process the API call request at the cloud server to generate an API response;

return the API response acquired from the cloud server to the robot scenario control device; and store the API-related information corresponding to the received API call request acquired from the cloud server, in the cache.

* * * * *